United States Patent
Hung et al.

(10) Patent No.: US 11,394,270 B2
(45) Date of Patent: *Jul. 19, 2022

(54) DIFFERENTIAL FOR AN ACTIVE CORE ELECTRIC MOTOR HAVING PIN WITH FRICTION FIT

(71) Applicant: Atieva, Inc., Newark, CA (US)

(72) Inventors: Shun-Cheng Hung, Taipei (TW); Jeremy Mayer, Mountain View, CA (US); Balazs Palfai, Dublin, CA (US); Michael David Kennedy, Boulder Creek, CA (US)

(73) Assignee: Atieva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,474

(22) Filed: May 4, 2021

(65) Prior Publication Data
US 2021/0399609 A1    Dec. 23, 2021

Related U.S. Application Data

(63) Continuation of application No. 16/182,755, filed on Nov. 7, 2018, now Pat. No. 11,005,337, which is a
(Continued)

(51) Int. Cl.
*F16H 48/08*    (2006.01)
*H02K 7/116*    (2006.01)
(Continued)

(52) U.S. Cl.
CPC ............ *H02K 7/116* (2013.01); *F16H 48/08* (2013.01); *F16H 48/40* (2013.01); *F16H 2048/387* (2013.01)

(58) Field of Classification Search
CPC ......... H02K 7/116; F16H 48/08; F16H 48/40; F16H 2048/387; F16H 48/12;
(Continued)

(56) References Cited

U.S. PATENT DOCUMENTS

| | | |
|---|---|---|
| 1,925,943 A | 9/1933 | Stein |
| 3,955,443 A | 5/1976 | Estrada |

(Continued)

FOREIGN PATENT DOCUMENTS

| | | |
|---|---|---|
| CN | 1136651 A | 11/1996 |
| CN | 1213050 A | 4/1999 |

(Continued)

OTHER PUBLICATIONS

Communication pursuant to Article 94(3) EPC for European Application No. 19201507.1, dated Jun. 17, 2021, 5 pages.

(Continued)

*Primary Examiner* — Justin Holmes
(74) *Attorney, Agent, or Firm* — Brake Hughes Bellermann LLP

(57) ABSTRACT

A gear assembly is provided that simplifies the integration of a differential assembly into the hollow rotor of an electric motor. The gear assembly utilizes a hollow cross member that includes a central portion and a plurality of hollow extension members onto which the gears are mounted. Within each of the hollow extension members is a pin. When the pins are withdrawn, the assembly fits unimpeded within the hollow rotor. When the pins are partially extended out of the corresponding extension members, the ends of the pins fit within apertures in the rotor. A plug fits within a centrally located thru-hole in the central portion of the hollow cross member, thereby locking the pins in the extended position and locking the gear assembly in place.

6 Claims, 4 Drawing Sheets

Related U.S. Application Data continuation-in-part of application No. 16/181,612, filed on Nov. 6, 2018, now Pat. No. 10,797,562.

(60) Provisional application No. 62/766,523, filed on Oct. 23, 2018.

(51) Int. Cl.
*F16H 48/40* (2012.01)
*F16H 48/38* (2012.01)

(58) Field of Classification Search
CPC ....... F16H 48/38; B60K 17/16; B60K 17/165; B60K 2001/001; B60K 1/00
See application file for complete search history.

(56) References Cited

U.S. PATENT DOCUMENTS

| | | | |
|---|---|---|---|
| 4,467,230 | A | 8/1984 | Rovinsky |
| 4,959,043 | A | 9/1990 | Klotz et al. |
| 5,685,798 | A | 11/1997 | Lutz et al. |
| 5,823,908 | A | 10/1998 | Stefanek |
| 7,316,627 | B2 | 1/2008 | Bennett |
| 8,967,004 | B2 | 3/2015 | Palfai et al. |
| 8,992,367 | B2 | 3/2015 | Kalmbach et al. |
| 10,788,119 | B2 | 9/2020 | Suzuki |
| 11,005,337 | B2 | 5/2021 | Hung et al. |
| 11,092,222 | B2* | 8/2021 | Lang ...................... F16H 48/08 |
| 11,131,371 | B2* | 9/2021 | Kang .................... F16H 37/041 |
| 2003/0032519 | A1 | 2/2003 | Lovatt |
| 2009/0026868 | A1 | 1/2009 | Morgante |
| 2011/0160017 | A1 | 6/2011 | Honda |
| 2012/0004044 | A1* | 1/2012 | Conger .................. F16D 3/227 464/141 |
| 2012/0129644 | A1 | 5/2012 | Palfai et al. |
| 2013/0274053 | A1 | 10/2013 | Bauerlein et al. |
| 2013/0281247 | A1 | 10/2013 | Holmes |
| 2014/0028139 | A1 | 1/2014 | Hamer et al. |
| 2015/0013488 | A1 | 1/2015 | Matsuoka et al. |
| 2016/0039277 | A1 | 2/2016 | Falls et al. |
| 2016/0079817 | A1 | 3/2016 | Hayashi et al. |

FOREIGN PATENT DOCUMENTS

| | | | |
|---|---|---|---|
| CN | 201705885 U | * | 1/2011 |
| CN | 103373342 A | | 10/2013 |
| CN | 104242509 A | | 12/2014 |
| CN | 104246300 A | | 12/2014 |
| CN | 210889832 U | | 6/2020 |
| DE | 102016200066 A1 | | 7/2016 |
| EP | 3352331 A1 | | 7/2018 |
| JP | H04339024 A | | 11/1992 |
| JP | H10159940 A | | 6/1998 |
| JP | 2000283263 A | | 10/2000 |
| JP | 2001330111 A | | 11/2001 |
| JP | 2003130146 A | | 5/2003 |
| JP | 2005036911 A | | 2/2005 |
| JP | 2006349116 A | | 12/2006 |
| JP | 2009133365 A | | 6/2009 |
| JP | 2010230162 A | | 10/2010 |
| JP | 2010263761 A | | 11/2010 |
| JP | 2010264580 A | | 11/2010 |
| JP | 2012161207 A | | 8/2012 |
| JP | 2012240599 A | | 12/2012 |
| JP | 2013053737 A | | 3/2013 |
| JP | 2013221566 A | | 10/2013 |
| JP | 2014019336 A | | 2/2014 |
| JP | 2014040873 A | | 3/2014 |
| JP | 2014147228 A | | 8/2014 |
| JP | 2014177781 A | | 9/2014 |
| JP | 5852144 B2 | | 12/2015 |
| JP | 2016135068 A | | 7/2016 |
| JP | 2017222310 A | | 12/2017 |
| JP | 2018082540 A | | 5/2018 |
| KR | 100309345 B1 | | 9/2001 |
| KR | 20040074915 A | | 8/2004 |
| KR | 20140035020 A | | 3/2014 |
| KR | 20140063674 A | | 5/2014 |
| KR | 20150109251 A | | 10/2015 |
| WO | 2009096975 A1 | | 8/2009 |
| WO | 2012014260 A1 | | 2/2012 |
| WO | 2012053361 A1 | | 4/2012 |
| WO | 2014/116802 A1 | | 7/2014 |
| WO | 2017214232 A1 | | 12/2017 |

OTHER PUBLICATIONS

Decision of Rejection with English translation for Japanese Application No. 2019-184764, dated Dec. 8, 2020, 7 pages.
Examiner's Report for Japanese Application No. 2019-184764, dated Jun. 22, 2021, along with English translation, 5 pages.
Office Action for Japanese Application No. 2019-184667, dated Jan. 5, 2021, along with machine English Translation, 20 pages.
Office Action for Japanese Application No. 2019-184777, dated Jan. 5, 2021, along with machine English Translation, 8 pages.
Office Action with English translation for Korean Application No. 10-2019-0128358, dated Sep. 11, 2020, 12 pages.
Notice of Allowance with English translation for Korean Application No. 10-2019-0128358, dated May 3, 2021, 3 pages.
Office Action with English translation for Korean Application No. 10-2019-0128359, dated Oct. 19, 2020, 8 pages.
Notice of Allowance with English translation for Korean Application No. 10-2019-0128360, dated Jun. 21, 2021, 3 pages.
Office Action with English translation for Korean Application No. 10-2019-0128361, dated Sep. 17, 2020, 15 pages.
Office Action for Korean Application No. 10-2021-0124834 along with English translation, dated Dec. 1, 2021, 8 pages.

* cited by examiner

DIFFERENTIAL FOR AN ACTIVE CORE ELECTRIC MOTOR HAVING PIN WITH FRICTION FIT

CROSS-REFERENCE TO RELATED APPLICATION

This application is a continuation of U.S. patent application Ser. No. 16/182,755, filed Nov. 7, 2018, which is a continuation-in-part of U.S. patent application Ser. No. 16/181,612, filed 6 Nov. 2018, now U.S. Pat. No. 10,797,562, which claims benefit of the filing date of U.S. Provisional Patent Application Ser. No. 62/766,523, filed 23 Oct. 2018, the disclosures of which are incorporated herein by reference for any and all purposes.

FIELD OF THE INVENTION

The present invention relates generally to electric motors and, more particularly, to a removable differential assembly for use in an active core electric motor.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drivetrains into their vehicle line-ups. To meet consumer expectations, however, the automobile industry must not only achieve a greener drivetrain, but must do so while maintaining reasonable levels of performance, range, reliability, safety and cost.

The most common approach to achieving a low emission, high efficiency car is through the use of a hybrid drivetrain in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drivetrain of a hybrid vehicle is typically more complex than that of either a conventional ICE-based vehicle or an all-electric vehicle, resulting in increased cost and weight. Accordingly, several vehicle manufacturers are designing vehicles that only utilize an electric motor, thereby eliminating one source of pollution while significantly reducing drivetrain complexity.

While a variety of hybrid and all-electric vehicles are known, a high power density powertrain that fits within a reduced envelope is desired in order to increase the available space for occupants, cargo, and other vehicle components/accessories. One method of achieving a reduced powertrain envelope is to coaxially align the traction motor with the drive wheel axes using a planetary-differential-planetary configuration. In such a design, the differential may be integrated within the rotor of the electric motor, this configuration being commonly referred to as an active core motor. While this approach allows a compact powertrain assembly to be achieved, the durability and serviceability of the internally mounted differential can affect both the performance and reliability of an electric vehicle (EV) utilizing such an assembly. Accordingly, the present invention provides a durable and easily accessible/serviceable differential assembly for an active core motor.

SUMMARY OF THE INVENTION

The present invention provides a gear assembly that is configured for integration within the hollow rotor of an electric motor. The gear assembly includes a hollow cross member, a plurality of gears, and a plurality of pins. The hollow cross member of the assembly includes a central body portion, a central body thru-hole within the central body portion, and a plurality of hollow extension members that extend outwards from the central body portion, where each hollow extension member is in fluid communication with the centrally located thru-hole. Preferably the hollow extension members are comprised of four hollow extension members that are uniformly spaced about the central body portion of the hollow cross member. The plurality of gears is configured to be mounted on the plurality of hollow extension members. Each of the plurality of pins is configured to slide within a corresponding hollow extension member and is positionable between a first, withdrawn position and a second, extended position. When the pins are extended, a first end portion of each pin fits within a corresponding aperture in the hollow rotor and the centrally located thru-hole is coaxially aligned with the rotor axis. When the pins are withdrawn, the hollow cross member fits unimpeded into the hollow rotor. A plug member may be configured to fit within the central body thru-hole when each of the pins is in the second, extended position. The plug member may include a thru-hole, and the plug member thru-hole may be coaxially aligned with the rotor axis when the plug member is mounted within the central body thru-hole of the central body portion of the hollow cross member.

In one aspect, a second end portion of each pin, which is inwardly directed towards the central body thru-hole of the central body portion of the hollow cross member, may be tapered.

In another aspect, the gear assembly may include a plurality of spring members (e.g., bevel springs). These spring members are interposed between each of the gears and the corresponding face of the central body portion of the hollow cross member.

In another aspect, the gear assembly may include a plurality of washers (e.g., friction washers), each of which is mounted to the end portion of a corresponding hollow extension member. As a result, when the gears are mounted to the hollow cross member, each of the gears is interposed between one of the washers and the central body portion of the hollow cross member. The end portion of each of the hollow extension members may include at least one anti-turn tab that fits within a complementary feature on a corresponding washer, the anti-turn tab preventing the washer from rotating.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure.

Figure 1:
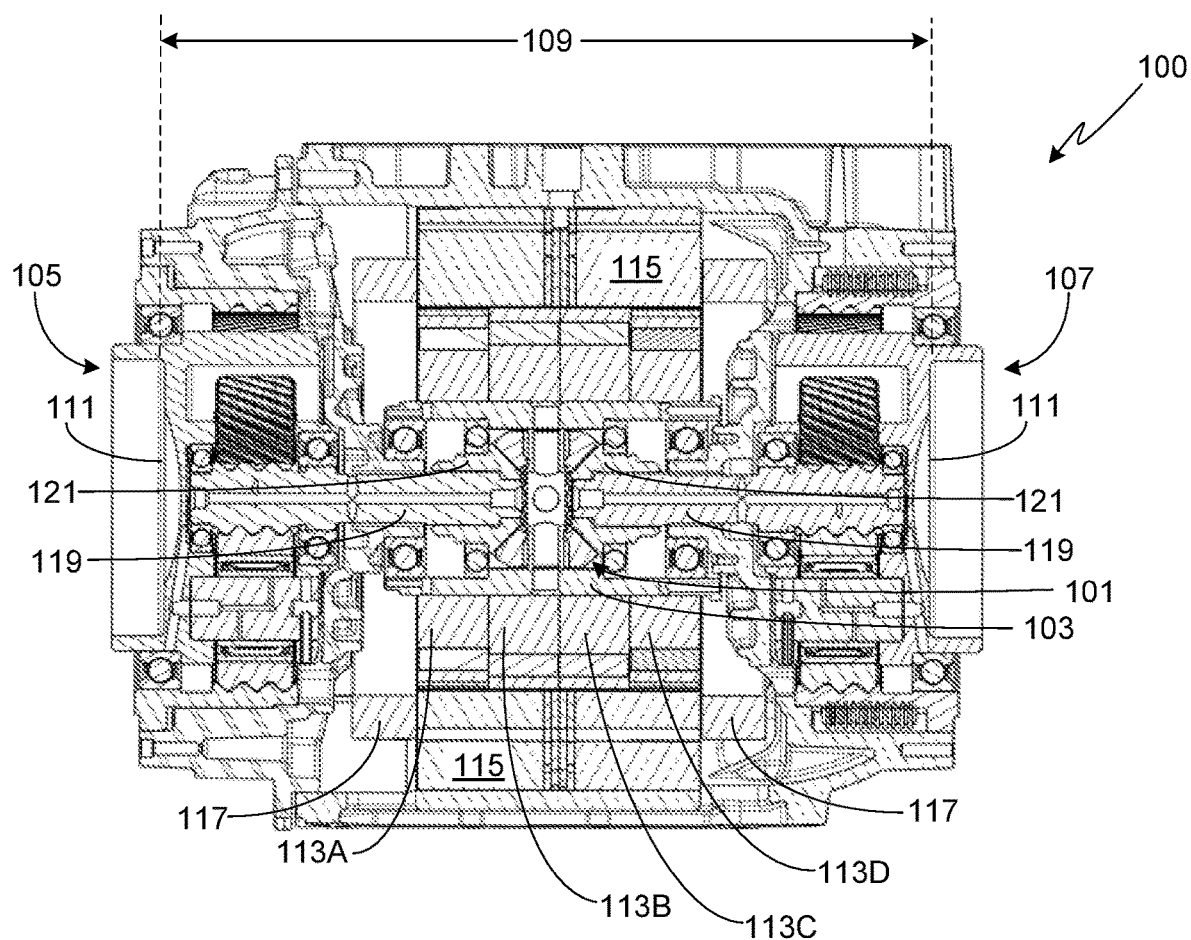
FIG. 1 provides a cross-sectional view of a powertrain assembly incorporating the differential assembly of the invention.

FIG. 1 provides a cross-sectional view of a powertrain assembly 100 that incorporates a differential gear assembly 101 within hollow rotor shaft 103, where differential assembly 101 is designed in accordance with the invention. Utilizing the active core configuration, powertrain assembly 100 is arranged such that planetary assembly 105, differential gear assembly 101, and planetary assembly 107 are coaxially aligned, thereby creating a powertrain with a relatively short width 109, where width 109 is measured between the bottom surfaces 111 of the two constant velocity (i.e., CV) joint housing members.

Although not required by the invention, in the illustrated assembly hollow rotor shaft 103 is directly connected to the rotor lamination stack, thereby achieving a high speed motor proportion configuration suitable for use in an electric vehicle (EV). In the illustrated embodiment, the lamination stack is comprised of four lamination pack layers 113A-113D. It should be understood that this lamination stack configuration is not required by the invention. Surrounding the rotor lamination stack is stator 115. Visible in this view are the stator windings 117 that extend from either end of the stator.

As described in detail below, the present invention provides a removable differential gear assembly 101 that is configured to be mounted within the rotor of an electric motor. Output drive shafts 119 are coupled to differential assembly 101 using gears 121.

Figure 2:
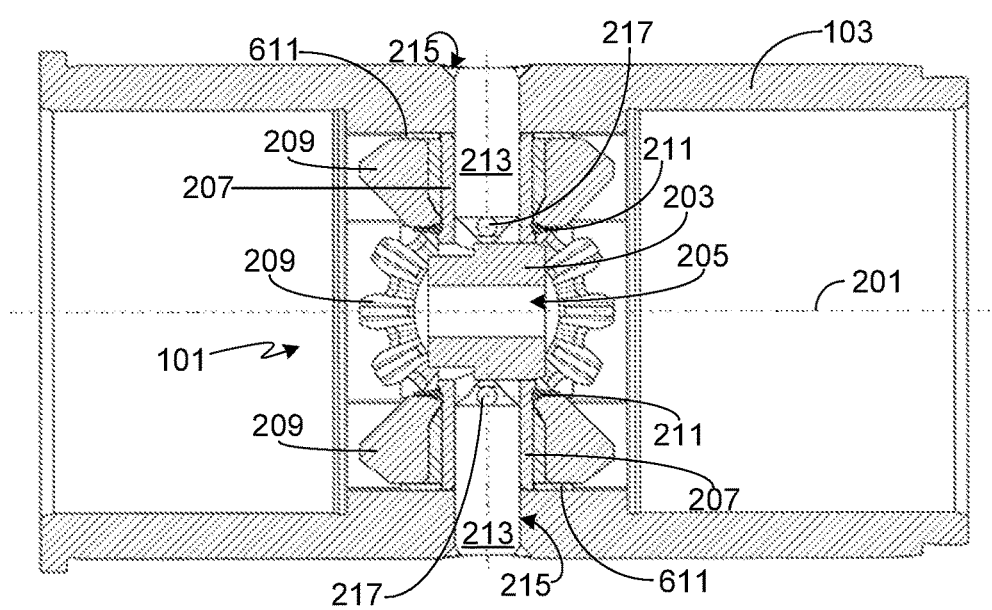
FIG. 2 provides a detailed cross-sectional view of the differential gear assembly of the invention mounted within a hollow rotor shaft.
Figure 3:
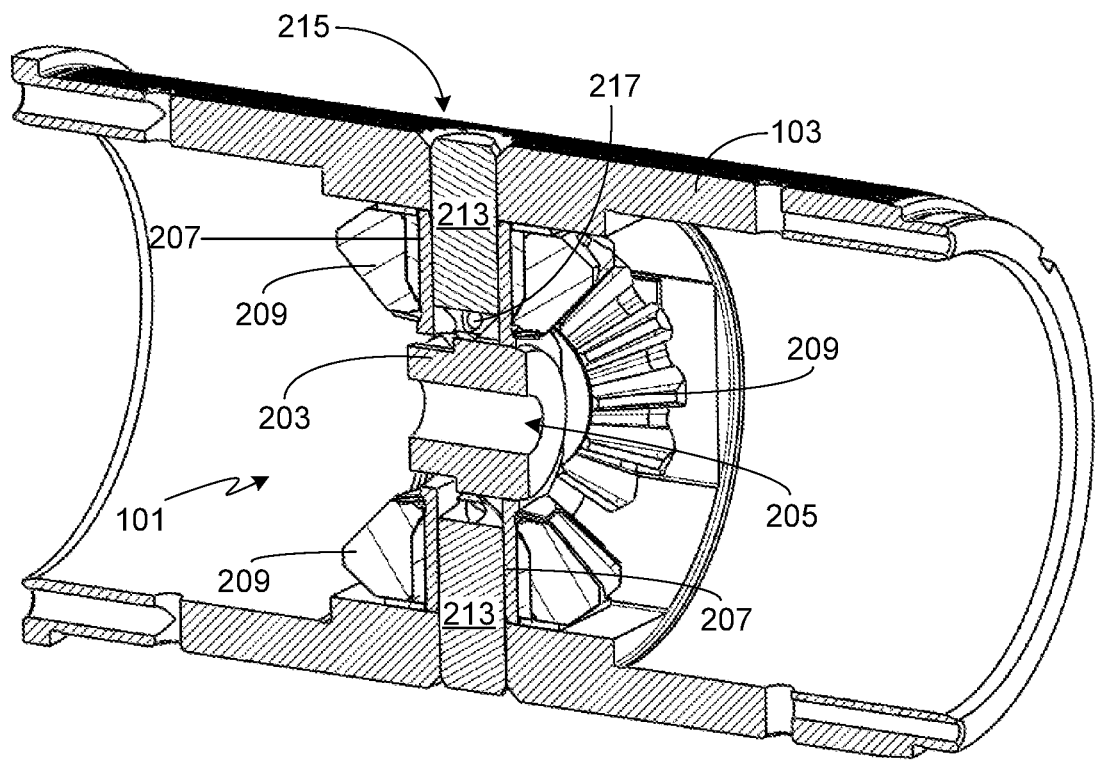
FIG. 3 provides a perspective cross-sectional view of the assembly shown in FIG. 2.
Figure 4:
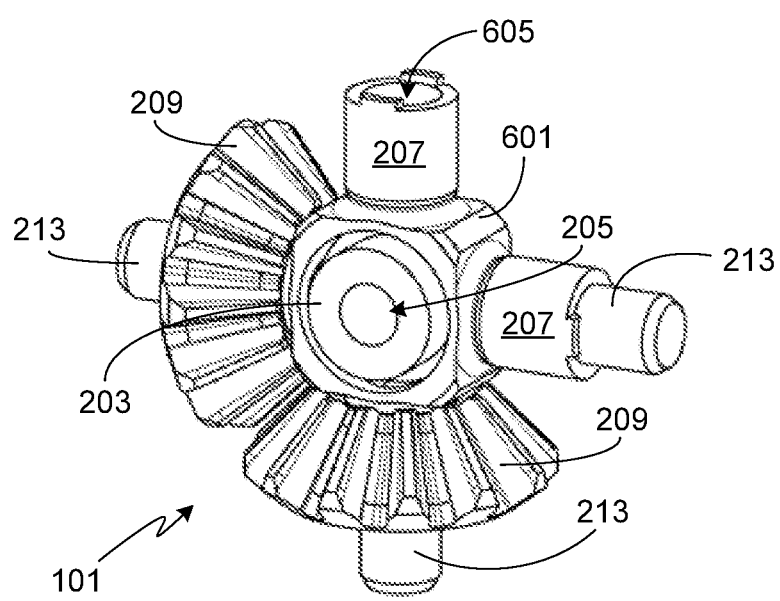
FIG. 4 provides a perspective front view of a portion of the differential gear assembly shown in FIGS. 1-3, this view only showing two of the gears and three of the radial pins in place.
Figure 5:
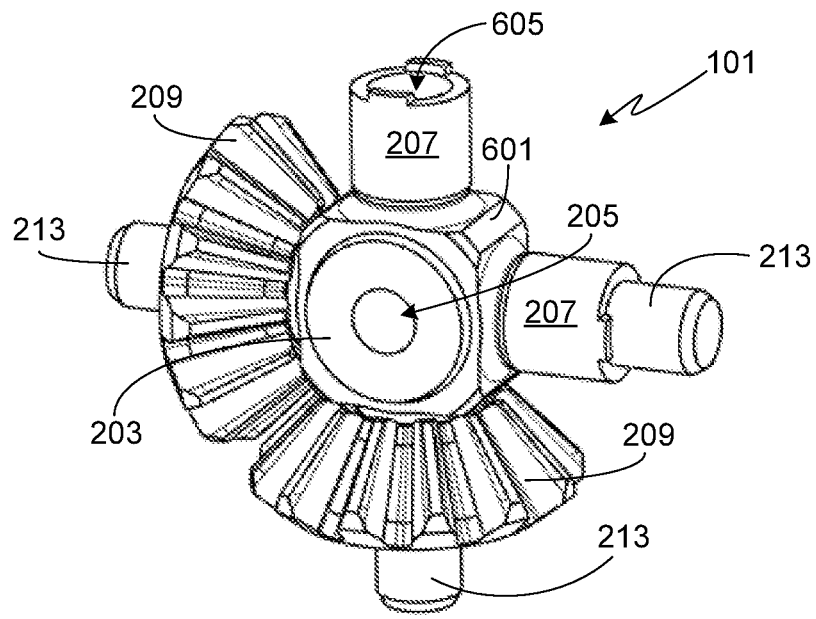
FIG. 5 provides a perspective rear view of a portion of the differential gear assembly shown in FIGS. 1-3, this view only showing two of the gears and three of the radial pins in place.
Figure 6:
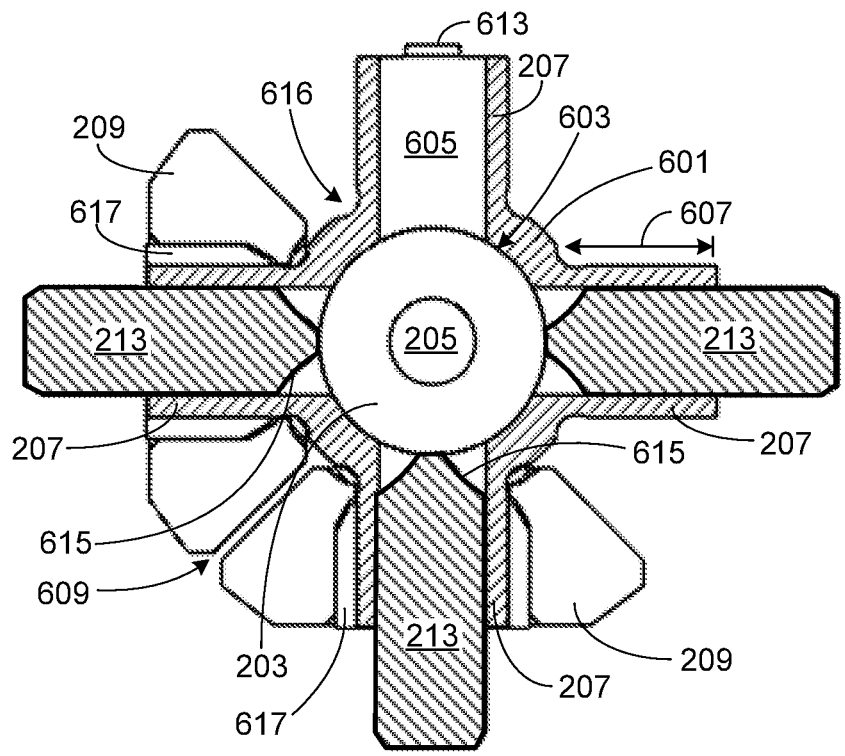
FIG. 6 provides a cross-sectional view of the assembly shown in FIG. 5, where this view is orthogonal to the cross-sectional view shown in FIG. 2.
Figure 7:
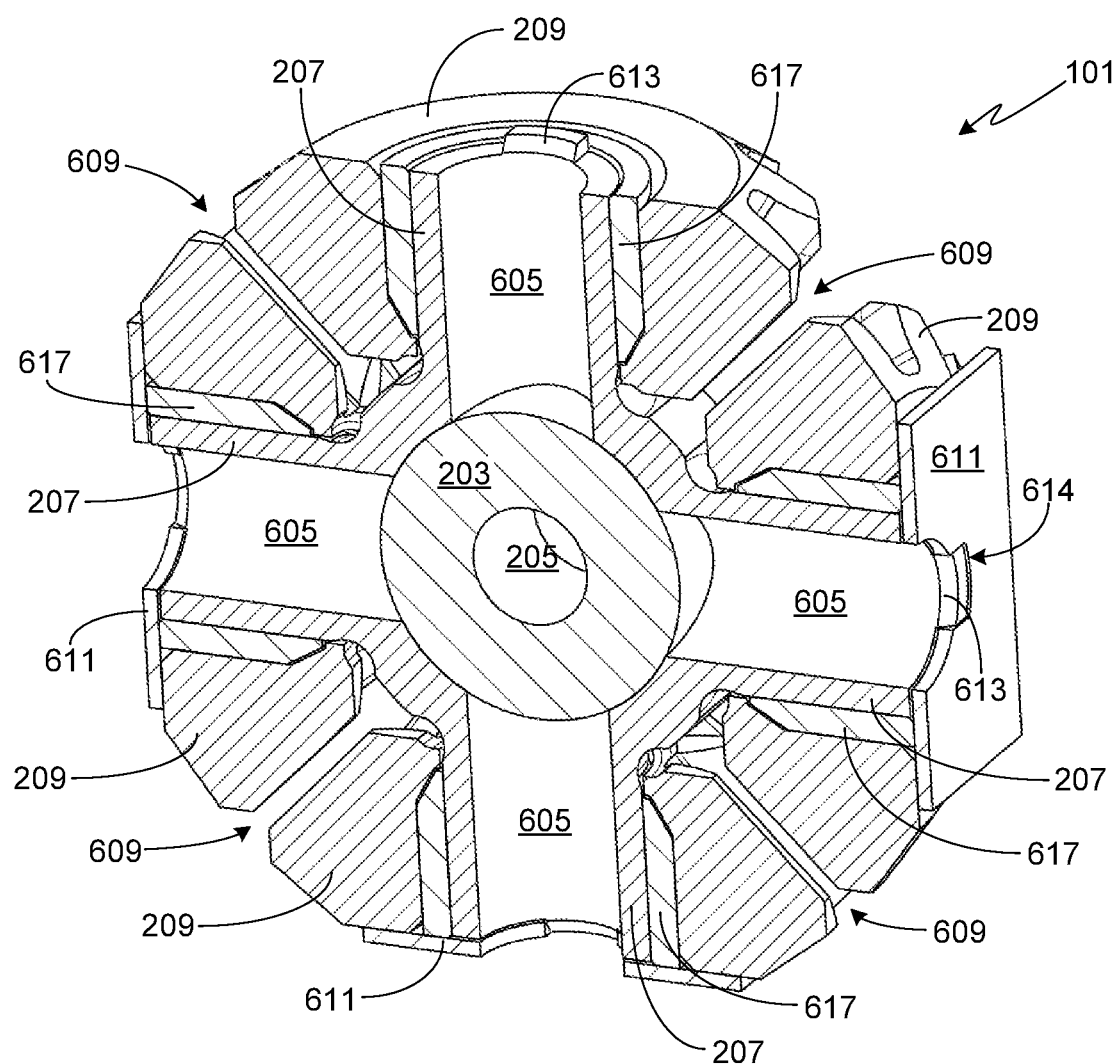
FIG. 7 provides a perspective cross-sectional view of the differential gear assembly shown in FIGS. 1-6, this view showing all four gears in place and all four of the radial pins removed.

FIG. 2 provides a detailed cross-sectional view of differential gear assembly 101 mounted within rotor shaft 103. FIG. 3 provides a perspective cross-sectional view of the assembly shown in FIG. 2. FIGS. 4 and 5 provide perspective front and rear views, respectively, of a portion of gear assembly 101, these views only showing two of the gears and three of the radial pins in place. FIG. 6 is a cross-sectional view of the assembly shown in FIG. 5. Note that the cross-sectional view shown in FIG. 6 is orthogonal to the cross-sectional view shown in FIG. 2. FIG. 7 provides a perspective cross-sectional view of assembly 101 with all four gears in place and all four of the radial pins removed.

The primary component of assembly 101 is a hollow cross member 601, best viewed in FIGS. 6 and 7. The central body of cross member 601 includes a thru-hole 603. Preferably thru-hole 603 is cylindrically shaped, and more preferably thru-hole 603 is cylindrically shaped and coaxial with rotor axis 201 as shown. In the preferred embodiment, a plug 203 that has a complementary shape to that of thru-hole 603 is configured to fit within thru-hole 603 of cross member 601. Preferably plug 203 includes a thru-hole 205. Thru-hole 205, which is preferably coaxial with rotor axis 201 as well as the cylindrical axis of plug 203, allows fluid to flow easily from one side of the differential assembly to the other, for example between output drive shafts 119. Typically a suitable gear oil flows through thru-hole 205, this oil lubricating the differential assembly as well as other components within the powertrain.

Extending outwards from the body of cross member 601 are multiple hollow extensions 207. The thru-hole 605 within each hollow extension 207 extends into, and is in fluid communication with, the central aperture 603 of cross member 601. The length 607 of each cross member extension 207 is selected to ensure that the cross member 601 can slide unimpeded into hollow rotor 103 during differential integration. In the preferred embodiment, there are four cross member extensions 207 that are uniformly spaced about the body of cross member 601. It should be understood, however, that other configurations are envisioned by the inventors. For example, the assembly can utilize three hollow extensions 207 that are uniformly spaced about the body of cross member 601. Similarly, the assembly can utilize a non-uniform spacing, for example four hollow extensions 207 with a spacing of 89 degrees, 91 degrees, 89 degrees, and 91 degrees.

Prior to installing the cross member into rotor shaft 103, gears 209 and gear bearings 617 are installed on each cross member extension 207. Preferably gears 209 are identical in size, shape and tooth count. As shown, gears 209 are selected such that there is a space 609 between adjacent gears, thus ensuring that the gears do not interfere with one another during operation. In the preferred embodiment, a washer (e.g., a friction washer) 611 is placed at the end of each cross member extension 207 after gear assembly. A tab 613, which extends from a portion of the end surface of each cross member extension 207, fits within a complementary opening 614 of washer 611, thereby preventing washer 611 from rotating when the corresponding gear rotates. In at least one embodiment, a spring member 211 (e.g., a bevel spring or bushing) is placed between each gear 209 and the corresponding face 616 of cross member 601.

Four pins 213 hold the differential assembly inside of the hollow rotor shaft 103. Pins 213 fit within the cross member extensions 207 as shown, extending between the cross member and a corresponding thru-hole 215 in the rotor. As a result, the cross member assembly is locked into the rotor. Preferably the end portion 615 of each pin 213 is tapered, thus simplifying the assembly and disassembly processes.

It will be appreciated that there are multiple ways to insert the differential assembly into the rotor and then lock it into place. In one approach, after mounting gears 209 and bearings 617 onto the cross member extensions 207 (with or without spring member 211, depending upon the configuration), pins 213 are placed within cross member extensions 207. Then washers 611 are installed. At this stage of assembly, plug 203 is not located within cross member aperture 603, thereby allowing pins 213 to be fully inserted into member 601. When fully inserted, the ends of pins 213 do not extend beyond the end surfaces of extensions 207. In this state, the differential assembly can be inserted into hollow rotor shaft 103. Once the differential assembly is inserted into rotor 103, pins 213 are aligned with the corresponding thru-holes 215 in the rotor. Once aligned, pins 213 are pushed outwards into rotor thru-holes 215. A special tool may be inserted into cross member thru-hole 603, causing pins 213 to be pushed outwards into the corresponding rotor thru-holes 215. An exemplary tool is cylindrically-shaped with a tapered leading face configured to gently force the pins in an outwards direction. Alternately, plug 203 may be used to force the pins outwards into rotor thru-holes 215. Pins 213 may be friction fit within rotor thru-holes 215. Alternately and as preferred, once pins 213 have been fully inserted into thru-holes 215, plug 203 is inserted into cross member thru-hole 603, thereby locking pins 213 into place. This is the preferred assembly technique if the lamination stack, or other component, has already been mounted onto the rotor shaft.

In an alternate approach of assembling the differential-rotor assembly, after mounting spring members 211 (if used), gears 209, bearings 617 and washers 611 onto the cross member extensions 207, the cross member 601 is located within rotor shaft 103. At this stage of assembly, pins 213 have not yet been inserted into the cross member. Preferably plug 203 has been inserted into cross member thru-hole 603, although it can also be inserted into thru-hole 603 after the pins have been properly positioned within the cross member. Once cross member 601 is properly located in the rotor such that extension thru-holes 605 are aligned with rotor thru-holes 215, pins 213 are pushed though the rotor thru-holes 215 and into the cross member extensions 207. As previously noted, if plug 203 was not previously inserted into cross member thru-hole 603, preferably it is inserted at this point in the assembly process. Once the pins are properly located, the lamination stack, or other component, is mounted onto the rotor shaft, thereby preventing the pins from falling out of the assembly.

Although not required, in at least one embodiment of the invention the end portion 615 of each pin 213 includes a small aperture 217 as seen in FIGS. 2 and 3. Aperture 217 allows a tool to be used to easily withdraw the pins into cross member 601 without removing the lamination stack, or other component, from the rotor. Thus if the differential assembly requires maintenance, it can be removed from the rotor without completely disassembling the rotor assembly.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An apparatus comprising:
   a hollow rotor shaft; and
   a differential gear assembly mounted within the hollow rotor shaft, the differential gear assembly comprising:
      a hollow cross member having a first through hole, wherein the first through hole is coaxial with the hollow rotor shaft;
      hollow extensions extending outwards from a body of the hollow cross member, each of the hollow extensions having a second through hole, wherein a length of each of the hollow extensions ensures that the hollow cross member can slide into the hollow rotor shaft;
      a plug having a complementary shape to the first through hole, the plug having a third through hole, wherein the third through hole is coaxial with the hollow rotor shaft;
      gears installed on each of the hollow extensions; and
      pins that fit within respective ones of the hollow extensions, each of the pins extending between the body of the hollow cross member and a corresponding fourth through hole of the hollow rotor shaft, wherein each of the pins is friction fit within the corresponding fourth through hole.

2. The apparatus of claim 1, wherein an end portion of each of the pins has an aperture.

3. The apparatus of claim 1, further comprising a corresponding spring member placed between each of the gears and a corresponding face of the hollow cross member.

4. The apparatus of claim 1, further comprising a corresponding washer placed at an end of each of the hollow extensions.

5. The apparatus of claim 4, further comprising a tab that extends from a portion of an end surface of each of the hollow extensions and fits within a complementary opening of the washer.

6. The apparatus of claim 1, further comprising gear bearings installed on each of the hollow extensions.

* * * * *